Aug. 14, 1962　　　　B. W. SCHABOT　　　3,049,032
ROTARY PRECISION WORK HOLDER
Filed Aug. 20, 1959　　　　　　　　　　　　4 Sheets-Sheet 1

INVENTOR.
BERNARD W. SCHABOT
BY
*Barney, Kivulle, Raisch & Choate*
ATTORNEYS

Aug. 14, 1962 B. W. SCHABOT 3,049,032
ROTARY PRECISION WORK HOLDER
Filed Aug. 20, 1959 4 Sheets-Sheet 2

INVENTOR.
BERNARD W. SCHABOT
BY
Barnes, Kisselle, Raisch & Choate
ATTORNEYS

Aug. 14, 1962 B. W. SCHABOT 3,049,032
ROTARY PRECISION WORK HOLDER
Filed Aug. 20, 1959 4 Sheets-Sheet 3

INVENTOR.
BERNARD W. SCHABOT
BY
Barnes, Kisselle, Raisch & Choate
ATTORNEYS

Aug. 14, 1962 B. W. SCHABOT 3,049,032
ROTARY PRECISION WORK HOLDER
Filed Aug. 20, 1959 4 Sheets-Sheet 4

INVENTOR.
BERNARD W. SCHABOT
BY
Barnes, Kisselle, Raisch & Choate
ATTORNEYS

United States Patent Office 3,049,032
Patented Aug. 14, 1962

3,049,032
ROTARY PRECISION WORK HOLDER
Bernard W. Schabot, Royal Oak, Mich.
(350 Fair St., Ferndale Station, Detroit, Mich.)
Filed Aug. 20, 1959, Ser. No. 834,969
12 Claims. (Cl. 77—64)

This application is a continuation-in-part of application, Serial No. 606,499, filed August 27, 1956, which has issued as Patent No. 2,921,486, dated January 19, 1960.

This invention relates to work holders and particularly to work holders which are adapted to support a workpiece and wherein the angular position of the workpiece may be accurately changed for successive operations.

In handling a workpiece in the metal-working industry, for example, in jig grinding or boring, a work holder is commonly used where it is desired to perform a series of operations at angularly spaced points on the workpiece. Such work holders usually comprise a table on which the workpiece is supported and a base on which the table is rotatably mounted by means of bearings. The angular position of the table to the base and, in turn, of the workpiece is changed by a worm which meshes with an annular worm gear on the underside of the table. Rotation of the worm causes rotation of the table.

A major disadvantage of such a work holder is that some type of accurate angular measuring device must be used in connection therewith in order that the angle of rotation will be accurately determined. This requires extreme care and necessarily involves an expenditure of a great deal of time in making each angular adjustment. In addition, since the worm meshes successively with different portions of the worm gear, the degree of angular movement for each revolution of the worm may vary because the successive portions of the worm and gear may vary in size and shape, so that it is not possible to accurately predetermine the angular movement in terms of rotation of the worm. A further disadvantage of these work holders is that some additional locking means must be provided to lock the table in its adjusted position relative to the base. Another disadvantage is that, upon wear of the bearings which support the table, the level of the table is changed thus further affecting the accuracy of the work holder. In addition, the use of the bearings necessitates care in keeping the bearings clean and properly lubricated.

It is an object of this invention to provide an improved work holder which may be used to quickly and accurately change the angular position of a workpiece without the use of any additional angular measuring devices.

It is a further object of this invention to provide such a work holder which has a very high accuracy at all angular positions.

It is a further object of this invention to provide such a work holder wherein the table is locked in adjusted position.

It is a further object of this invention to provide such a work holder which is not adversely affected by wear of the parts.

It is a further object of this invention to provide such a work holder having a novel construction for preventing the entry of dirt and the like between the teeth of the table and plate.

Basically, the work holder comprises a table for supporting a workpiece rotatably mounted on a plate which in turn is supported on a base. The juxtaposed faces of the table and the plate are each provided with an annular series of radially extending teeth or serrations which mesh and lock the table against rotation relative to the plate. The entire weight of the table and, in turn, the workpiece is carried by the teeth. The teeth are equally angularly spaced around he periphery of the table and plate and preferably are 360 in number so that by moving the table axially relative to the plate and then rotating the table relative to the plate by one tooth, the relative angular position of the table and plate is changed by one degree.

Figure 1:
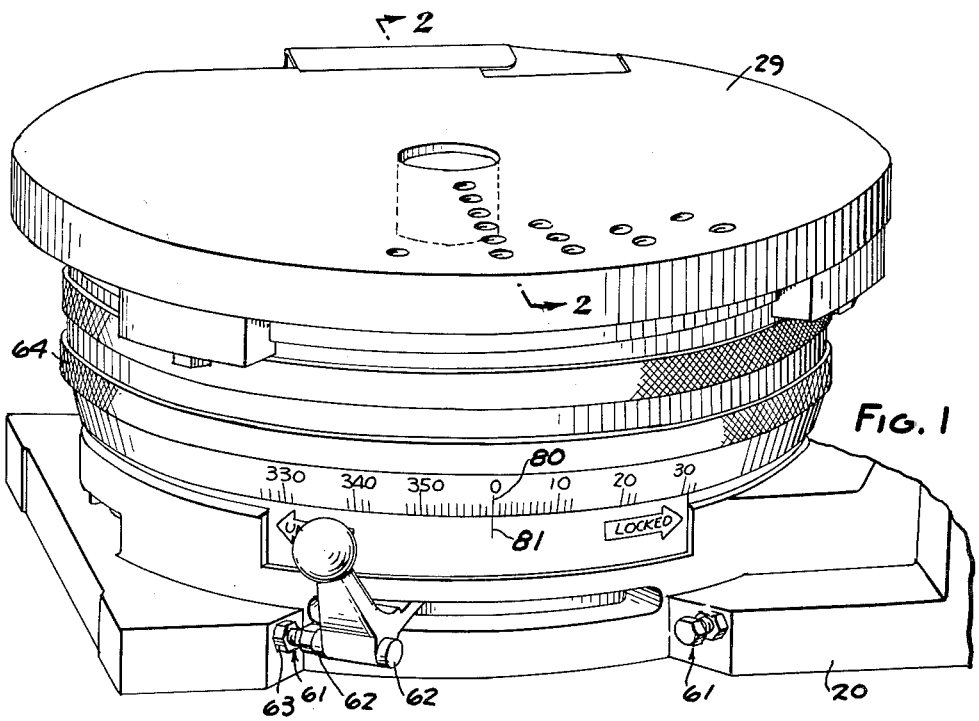
FIG. 1 is a perspective view of the work holder.
Figure 2:
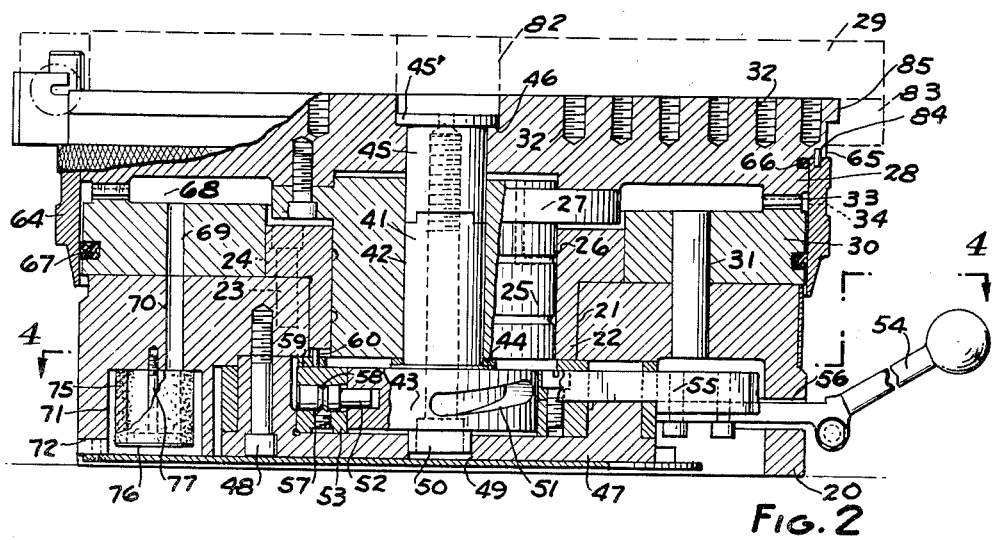
FIG. 2 is a generally vertical sectional view taken substantially along the line 2—2 in FIG. 1 with the operating lever in generally the mid position.

Referring to FIGS. 1 and 2, the work holder comprises a base 20 having a central opening 21 in which a bushing 22 is mounted. Bushing 22 is fixed on the base by screws 23 extending through a flange 24 at the upper end of the bushing 22 and threaded into the base 20. A trunnion 25 is mounted in the central opening 26 of bushing 22 and has an upper peripheral flange 27 which engages a portion of the undersurface of a work-supporting table 28. An adapter table 29 is shown mounted on the table 28 for purposes presently described. A ring 30 is fixed on the base 20 around flange 24 of bushing 22 by a plurality of pins 31 extending through the ring 30 into the base 20.

Table 28 has a flat top surface providing an accurate supporting plane. A workpiece may be supported on the table by clamps 105 (FIG. 16) which are held in position by screws 106 threaded into vertical threaded openings 32 in the table 28.

Figure 7:
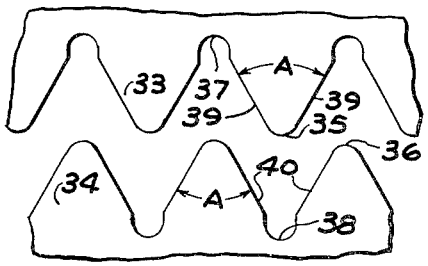
FIG. 7 is a developed enlarged view of the teeth in the work holder.

Table 28 and ring 30 are formed on the juxtaposed faces thereof with annular series of radially extending, wedge shaped teeth 33, 34, respectively, which are adapted to interengage and thereby lock the table 28 against rotation relative to the ring 30 and base 20. Teeth 33, 34 are accurately formed and finished in the faces of the table 28 and ring 30 and are of small size relative to the mass of the table 28 or ring 30. Teeth 33, 34 are accurately located relative to the center of opening 26. As shown in FIG. 7, the teeth 33, 34 are preferably triangular in cross section and the included angle A between the surfaces of each tooth is preferably 60 degrees.

Figure 3:
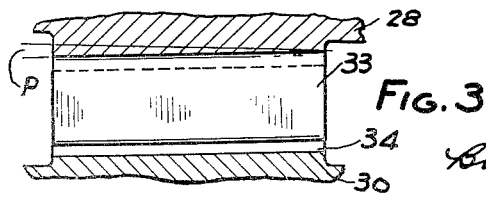
FIG. 3 is a fragmentary sectional view of a portion of the work holder shown in FIG. 2.

As shown in FIG. 3, each tooth has a radial pitch P. Where 360 teeth are provided, the pitch is 0 degrees 25 minutes 59 seconds. Teeth 33, 34 are preferably rounded at their apexes 35, 36 and the roots or valleys 37, 38 thereof are relieved as shown so that the teeth 33, 34 will contact with each other only along their inclined faces 39, 40. The entire weight of table 28, and, in turn, the workpiece on table 28, is supported by the teeth 33, 34.

Means are provided for moving the plate 28 axially relative to the ring 30 thereby disengaging the teeth 33, 34 and permitting the table 28 to be rotated to a different angular position relative to the ring 30 and base 20. This means includes a post 41 extending upwardly into an opening 42 in trunnion 25 and having an enlarged lower portion 43. A spacer 44 is provided between the trunnion 25 and the portion 43 and a table retainer plug 45 is provided on the upper end of the post 41. Plug 45 extends upwardly through a counterbore opening 46 in table 28. Plug 45 engages the upper end of post 41. The plug includes a flange 45' which engages the shoulder of counterbored opening 46 located centrally of table 28. A screw is threaded upwardly through post 41 into an opening in plug 45.

Figure 9:
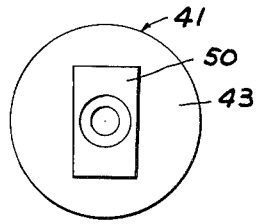
FIG. 9 is a bottom plan view of the central post of the work holder.
Figure 8:
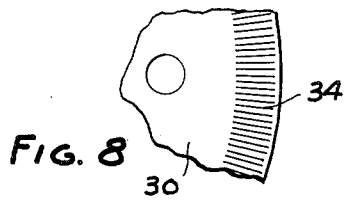
FIG. 8 is a fragmentary plan view of a portion of a work holder.

Post 41 is prevented from rotating relative to the base 20 by an arrangement which includes a retainer plate 47 mounted on the under side of base 20 in an opening therein and held in position by bolts 48 threaded into the base 20. Retainer 47 is provided with a non-circular opening 49 into which the lowermost end 50 of post 41, which is formed to a corresponding cross section, extends (FIG. 9). The post 41 is adapted to be moved upwardly and downwardly carrying with it the trunnion 25 and elevating the table 28 relative to the ring 30. The end 50 of post 41 is sufficiently long to insure that it will remain engaged with the opening 49 in all axial positions of the plate 28.

A specific mechanism for elevating and lowering the post 41 includes helical grooves 51 extending generally radially in the enlarged portion 43 of the post 41 and a plurality of face pins 52 mounted on a ring 53 and extending radially into the openings 51. The axial extent and pitch of grooves 51 is identical. Ring 53 is rotatably mounted in retainer plate 47. When the ring 53 is rotated relative to the base 20, the pins 52 ride in helical grooves 51 of post 41 and since post 41 cannot rotate it is elevated or lowered. A handle 54 is connected to the ring 53 by an extension 55 and extends radially outwardly through an opening 56 in the base 20 to provide a means for grasping the ring 53 and rotating it.

As shown in FIG. 2, each pin 52 is held in position by a set screw 57 which extends into an annular groove 58 in the pin. An annular spacer 59 is provided between ring 53 and base 20 and is held in position therein against rotation by pins 60 which extend into slots in bushing 22.

Figure 4:
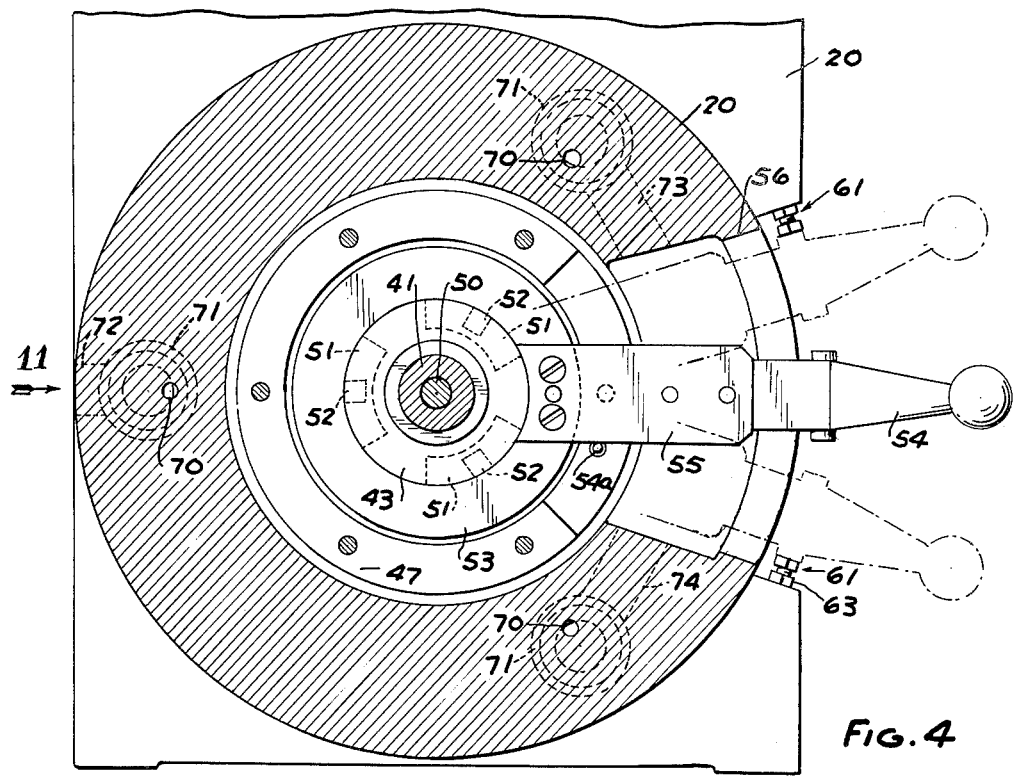
FIG. 4 is a sectional view taken along the line 4—4 in FIG. 2.
Figure 5:
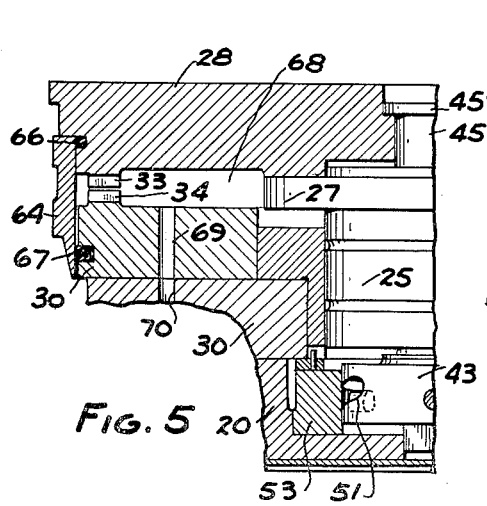
FIG. 5 is a fragmentary sectional view of a portion of the work holder shown in FIG. 2 with the parts in a different position.
Figure 6:
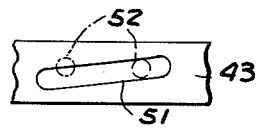
FIG. 6 is a fragmentary developed elevational view of a portion of the work holder.
Figure 10:
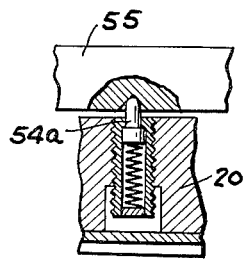
FIG. 10 is a sectional view of a detent used in holding the operating lever of the work holder in position.
Figure 12:
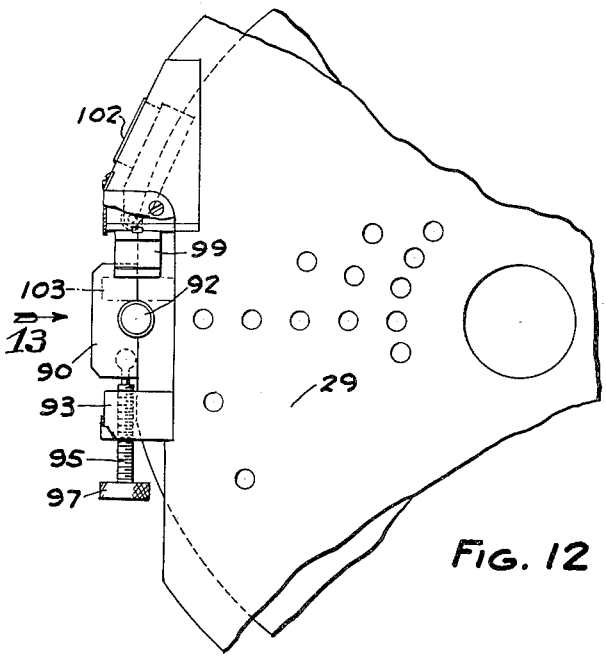
FIG. 12 is a fragmentary plan view of the fixture.
Figure 11:
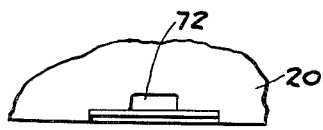
FIG. 11 is a fragmentary view taken along the line 11—11 in FIG. 4.
Figure 13:
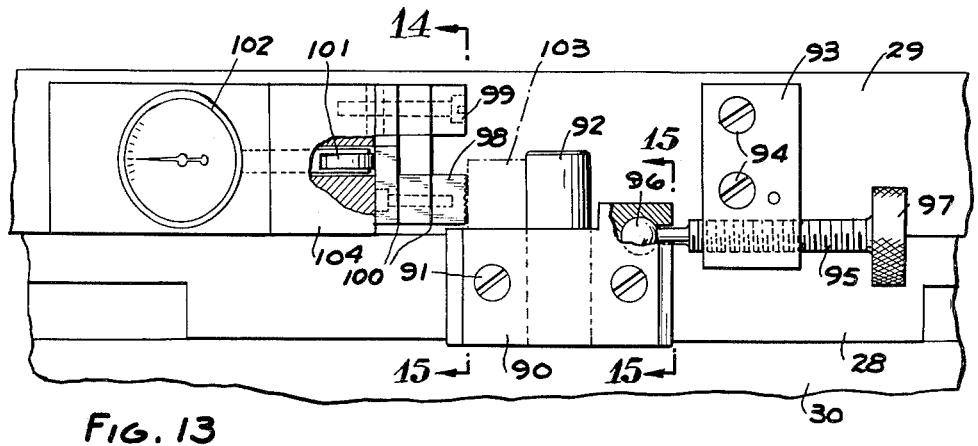
FIG. 13 is a fragmentary elevation taken in the direction of the arrow 13 in FIG. 12.
Figure 14:
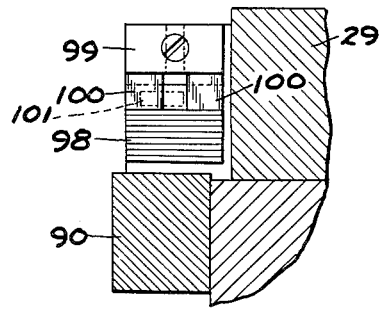
FIG. 14 is a fragmentary sectional view taken along the line 14—14 in FIG. 13.
Figure 15:
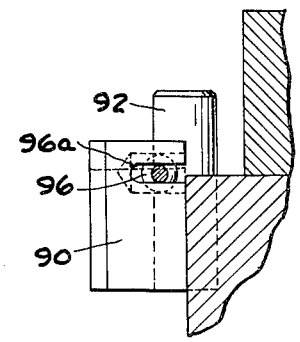
FIG. 15 is a fragmentary sectional view taken along the line 15—15 in FIG. 13.

The inclination of the helical grooves 51 is preferably such that as the table 28 is lowered bringing the teeth 33, 34 into engagement, the plate 28 is locked axially and no further movement of the lever 54 is permitted. In other words, the inclination is such that as the operator moves the handle 54 any further locking engagement of the teeth is prevented because of the ever increasing force that is encountered due to the angle of the helical grooves 51. In order to prevent damage in the event that an operator puts a wrench or other extension on the handle 54, adjustable stops 61 are provided and engage abutments 62 on the handle to positively limit its movement. Stops 61 comprise bolts threaded into the base 20 and locked in position by lock nuts 63 (FIGS. 1, 4). In addition, a spring loaded detent 54a is provided at one end of the travel of handle 54 to assist in holding the handle in locked position (FIG. 10).

The entry of dirt between the teeth 33, 34 is prevented by a peripheral skirt 64 which is mounted on the table 28 and prevented from rotating relative thereto by pins 65. The skirt 64 extends downwardly and surrounds the space between the teeth 33, 34. An O ring 66 is provided in a groove in table 28 adjacent the upper end of skirt 64 and a deformable annular sealing ring 67 is provided in a groove in the ring 30 adjacent the lower end of skirt 64. The cross section of the ring 67 is preferably cruciform. In this manner a seal is provided between the skirt and the table 28 and between the skirt and ring 30 preventing the entry of dust, dirt and the like into the area between the teeth 33, 34.

Although such a seal is quite efficient, it also makes it difficult to move the table 28 relative to the ring 30 because of the pressure or suction that is created in space 68 by movement of the table 28 axially relative to the ring 30. To prevent the creation of pressure or suction, provision is made for venting the space 68 between the plate 28 and ring 30. This comprises three vertically aligned passageways 69, 70 extending axially through the ring 30 and base 20 to three spaces 71 in the base 20 and thereby providing a communication between space 68 and spaces 71. As is shown in FIG. 2, one of the spaces 71 is in turn vented to the atmosphere through vent opening 72 which extends radially outwardly to the periphery of base 20 and the other two are vented through vent openings 73, 74 (FIG. 4) which extend generally tangentially to the space in which the handle and handle extension 54, 55 operate (FIG. 2). A filter is provided adjacent the lower end of each opening 70 to prevent dirt from entering. Each filter 75 is preferably tubular and is held in engagement with the upper end of space 71 by a cap 76 which closes the lower end of the filter and is held in position by a screw 77.

In order to give the operator a general idea of how much a table 28 should be rotated to obtain a predetermined angular position, scribe marks 80 in units corresponding to the spacing of the serrations are provided in the periphery of the skirt 64 (FIG. 1). These scribe marks 80 may be aligned with a scribe mark 81 on the base 20.

Where it is necessary to change the angular position of a workpiece by a fraction of the spacing between the teeth, the adapter table 29 is used. Adapter table 29 is circular and contains accurately machined flat faces so that it can rest on the upper surface of table 28. Adapter table 29 includes a locater plug 82 which extends downwardly into central opening 46 in table 28 and is retained against axial movement relative to the table 28 by clamps 83 mounted on the periphery of adapter table 29 and provided with radially inwardly extending flanges 84 for engaging a peripheral groove 85 on table 28.

Referring to FIGS. 12–15, the vernier mechanism for providing angular adjustment of the adapter plate 29 relative to the plate 28 in increments of less than one degree comprises a bracket 90 fastened to the periphery of plate 28 by screws 91 and having a pin 92 fixed therein and extending upwardly into the area provided by cutting away a portion of the plate 29. A bracket 93 mounted on plate 29 by screws 94 supports a horizontal screw 95 threaded in the bracket 93 and provided with a ball 96 at one end thereof and a knob 97 at the other end thereof. The ball 96 extends into a slot 96a in the bracket 90 so that when the screw 95 is rotated, the bracket 93 is caused to travel along the screw carrying the plate 29 with it. Pin 92 is adapted to engage against one side of an accurately formed gage block 103 and force the block against a support 98 which is suspended from a support 99 fixed on the table 29 by two pairs of thin flexible metal reeds 100. Support 98 is adapted to engage the movable actuator 101 of a micrometer dial 102. By this arrangement, when the knob 97 is rotated, rotating the screw 95, the bracket 93 is caused to travel along the screw rotating the plate 29 relative to table 28 causing the support 98 to engage the gage block 103 and force it against the pin 92. The flexible reeds 100 provide a limited movement of the support 98 relative to the abutment member 104 on which the support 99 is mounted. This movement is perceptible by a movement of the needle on the dial indicator 102. As a result, it is always possible to engage the gage block 103 with the same predetermined pressure, noting a predetermined movement of the needle. When it is desired to change the position of the table 29 by a predetermined portion of a degree, the gage block 103 is removed and replaced by another gage block of predetermined dimensions which will provide the accurate angular adjustment desired.

Figure 16:
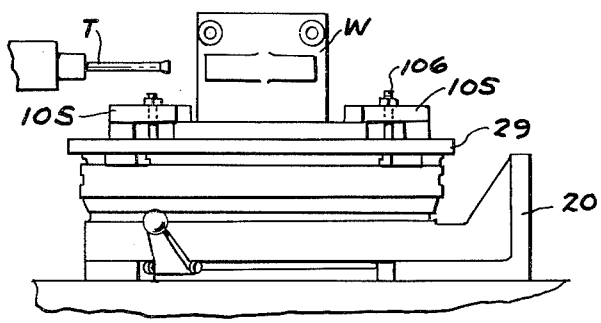
FIG. 16 is an elevational view of the work holder supporting a workpiece in position for performing an operation thereon.

The manner in which the work holder is used to support a workpiece in position is shown by referring to FIG. 16 wherein a workpiece W is accurately positioned on the adapter plate 29 by clamps 105 which are in turn held in position by screws 106 engaging holes in the plate 29. The axis of the workpiece W is accurately aligned with the axis of the work holder so that the workpiece is in position for machining or other operation performed by a tool T. By manipulating the work holder, it is possible to rotate the workpiece accurately between one angular position and another, and at the same time maintain the workpiece in the same accurate plane of the work table 29.

In order to assist the operator in accurately centering the workpiece on the work table 29, the central opening 42 in the work holder and the opening 82 in the adapter plate 29 are accurately formed and located relative to the teeth 33, 34.

The term "accurately finished" as used herein to describe the surface of the teeth is intended to mean that the teeth are formed with as high degree of accuracy as possible by the usual high quality forming methods such as grinding and lapping.

In forming the members 28, 30 on which the teeth 33, 34 are formed, the teeth are first formed and then the openings are accurately located and ground with relation to the teeth so that the center of the members 28, 30 is accurately determined.

I have found that the work holder made in accordance with my invention provides a means whereby the angular position of a workpiece mounted on the table 28 may be quickly and accurately changed by a predetermined number of degrees without the use of any external angular measuring devices. The degree of accuracy obtained by my work holder is extremely high on the order of at least one-tenth of a second of arc. The level of the table 28 remains the same in each adjusted position and at each point on the table. The angular movement is extremely accurate and consistent throughout the rotation of the table, that is, the angular movement of the table to a predetermined number of degrees in one peripheral position is exactly that in another peripheral position. There are no adverse effects because of wear because as the work holder is used the contacting faces of the teeth are lapped into more perfect contact thus actually improving the accuracy of the fixture with use.

Although I do not wish to be bound by the theory involved, in my opinion, the beneficial results obtained by my work holder are due to a great degree to the provision of a plurality of peripheral serrations or teeth on the table and ring which are initially accurately positioned and formed and also are of relatively small size relative to the mass of the table and ring so that when the table is moved axially to engage the teeth, the teeth accurately locate the table.

I claim:

1. In a rotary precision work holder, the combination comprising a base, a ring, means for fixing said ring on said base, a table having an upper flat work-supporting surface, a trunnion fixed on the lower surface of said table and extending axially through said ring into an opening in said base, said table and ring having juxtaposed surfaces with a plurality of radially extending teeth thereon, said teeth being accurately finished and equally angularly spaced and being generally wedge shaped in cross section, and means for moving said trunnion axially thereby moving said table toward and away from said ring and locking said teeth in engagement, the entire weight of said table being supported by said teeth, said means for moving said plate axially and locking said teeth comprising a post extending through said trunnion, means for fixing said post against axial movement relative to said table, means for fixing said post against rotational movement relative to said base, said post having an enlarged lower portion with a plurality of helical grooves therein, said grooves having a substantially identical lead angle, a ring surrounding said enlarged lower portion and rotatably mounted in said base, a plurality of pins mounted on said ring and extending radially inwardly into said grooves, and means for rotating said ring.

2. The combination set forth in claim 1 wherein said means for fixing said post on said table against axial movement comprises a flange on said post spaced from said enlarged portion of said post, said flange being in engagement with a transverse surface of said plate, the enlarged portion of said post extending radially outwardly beneath said trunnion to operatively engage with the lower end of said trunnion.

3. The combination set forth in claim 2 wherein said means for fixing said post against rotation relative to said base comprises a non-circular opening in said base, said post having a corresponding cross section at the lower end thereof extending into said opening.

4. The combination set forth in claim 3 wherein said means for rotatably mounting said ring comprises a retainer plate mounted on said base and defining an annular seat for said ring.

5. The combination set forth in claim 4 wherein said means for rotating said ring comprises a lever fixed thereto and extending radially outwardly through an opening in said base.

6. The combination set forth in claim 5 including stops on said base for positively limiting the angular movement of said lever relative to said base.

7. In a rotary precision work holder, the combination comprising a base, a ring, means for fixing said ring on said base, a table having an upper flat work-supporting surface, a trunnion fixed on the lower surface of said table and extending axially through said ring into an opening in said base, said table and ring having juxtaposed surfaces with a plurality of radially extending teeth thereon, said teeth being accurately finished and equally angularly spaced and being generally wedge shaped in cross section, and means for moving said trunnion axially thereby moving said table toward and away from said ring and locking said teeth in engagement, the entire weight of said table being supported by said teeth, including a peripheral skirt mounted on one of said tables or ring and extending axially around the periphery thereof and surrounding the space between the teeth, means for sealing the area between said skirt and each of said members, whereby the space radially inwardly of said teeth is isolated from the exterior, said base having openings therein for venting said space to the exterior, and means for filtering air passing through said openings.

8. The combination set forth in claim 7 wherein said openings in said base are circumferentially spaced and extend generally axially.

9. The combination set forth in claim 7 wherein said means for sealing the area between said skirt and each of said members comprises a ring interposed between said skirt and each of said members, said ring being made of elastic material.

10. In a rotary precision work holder, the combination comprising a first member, a second member having a flat surface on which a workpiece may be mounted, said second member being mounted for rotation relative to said first member and for movement forward and away from said first member, the juxtaposed faces of said first and second members being provided with interengaging means, a peripheral skirt mounted on one of said members and extending axially around the periphery thereof and surrounding the space between said members, means for sealing the area between said skirt and said members, whereby the space radially inwardly of said interengaging means is isolated from the exterior, said one member having openings therein for venting said space to the exterior, and means for filtering air passing through said openings.

11. The combination set forth in claim 10 wherein said openings are circumferentially spaced and extend generally axially.

12. The combination set forth in claim 10 wherein said means for sealing comprises an elastic ring interposed between said skirt and each said member.

References Cited in the file of this patent

UNITED STATES PATENTS

| | | |
|---|---|---|
| 1,690,568 | Bullard | Nov. 6, 1928 |
| 1,946,835 | Buhr | Feb. 13, 1934 |
| 2,177,006 | Rusmak | Oct. 24, 1939 |
| 2,921,487 | Schabot | Jan. 19, 1960 |

FOREIGN PATENTS

| | | |
|---|---|---|
| 408,394 | Great Britain | Apr. 12, 1934 |